(12) United States Patent
Haws et al.

(10) Patent No.: US 7,056,417 B2
(45) Date of Patent: Jun. 6, 2006

(54) METHOD AND APPARATUS FOR SEALING FLANGES AND DEFORMING PROFILES OF PLASTIC ZIPPER

(75) Inventors: Lewis Albert Haws, Duluth, GA (US); John H. Schneider, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 225 days.

(21) Appl. No.: 10/439,847

(22) Filed: May 16, 2003

(65) Prior Publication Data

US 2004/0226148 A1    Nov. 18, 2004

(51) Int. Cl.
*B29C 65/08* (2006.01)
(52) U.S. Cl. .................. 156/580.2; 156/73.1; 156/553
(58) Field of Classification Search .............. 156/73.1, 156/290, 308.2, 308.4, 553, 580.1, 580.2, 156/583.1; 264/442, 443, 445; 425/174.2
See application file for complete search history.

(56) References Cited

U.S. PATENT DOCUMENTS

| | | | |
|---|---|---|---|
| 3,756,900 A * | 9/1973 | Michel | 156/580.2 |
| 4,534,818 A * | 8/1985 | Kreager et al. | 156/466 |
| 5,088,971 A | 2/1992 | Herrington | 493/203 |
| 5,950,285 A | 9/1999 | Porchia et al. | 24/400 |
| 6,036,796 A | 3/2000 | Halbert et al. | 156/64 |
| 6,178,602 B1 | 1/2001 | Burke et al. | 24/30.5 R |
| 6,287,001 B1 | 9/2001 | Buchman | 383/64 |
| 6,357,914 B1 | 3/2002 | Kinigakis et al. | 383/64 |
| 6,562,166 B1 * | 5/2003 | Molander et al. | 156/73.1 |
| 6,733,622 B1 * | 5/2004 | McMahon et al. | 156/580.2 |
| 6,824,630 B1 * | 11/2004 | Oishi et al. | 156/73.1 |

\* cited by examiner

*Primary Examiner*—James Sells
(74) *Attorney, Agent, or Firm*—Ostrager Chong Flaherty & Broitman P.C.

(57) ABSTRACT

A method of manufacture involves the following steps: extruding a first zipper strip comprising a first zipper flange and a first closure profile; extruding a second zipper strip comprising a second zipper flange and a second closure profile that is interlockable with the first closure profile; interlocking the first and second closure profiles; and welding the first and second zipper flanges together in a first zone and welding the first and second closure profiles together in a second zone by applying energy to both zones in one operation or in separate operations. A generally T-shaped zone of fusion is formed. The second zone forms the top of the T shape, while the first zone forms the stem of the T shape. The first zone forms respective flange seals, while the second zone forms either back-to-back preseals or back-to-back slider end stops when the zipper is cut, depending on whether the zipper is sliderless or slider-actuated.

19 Claims, 7 Drawing Sheets

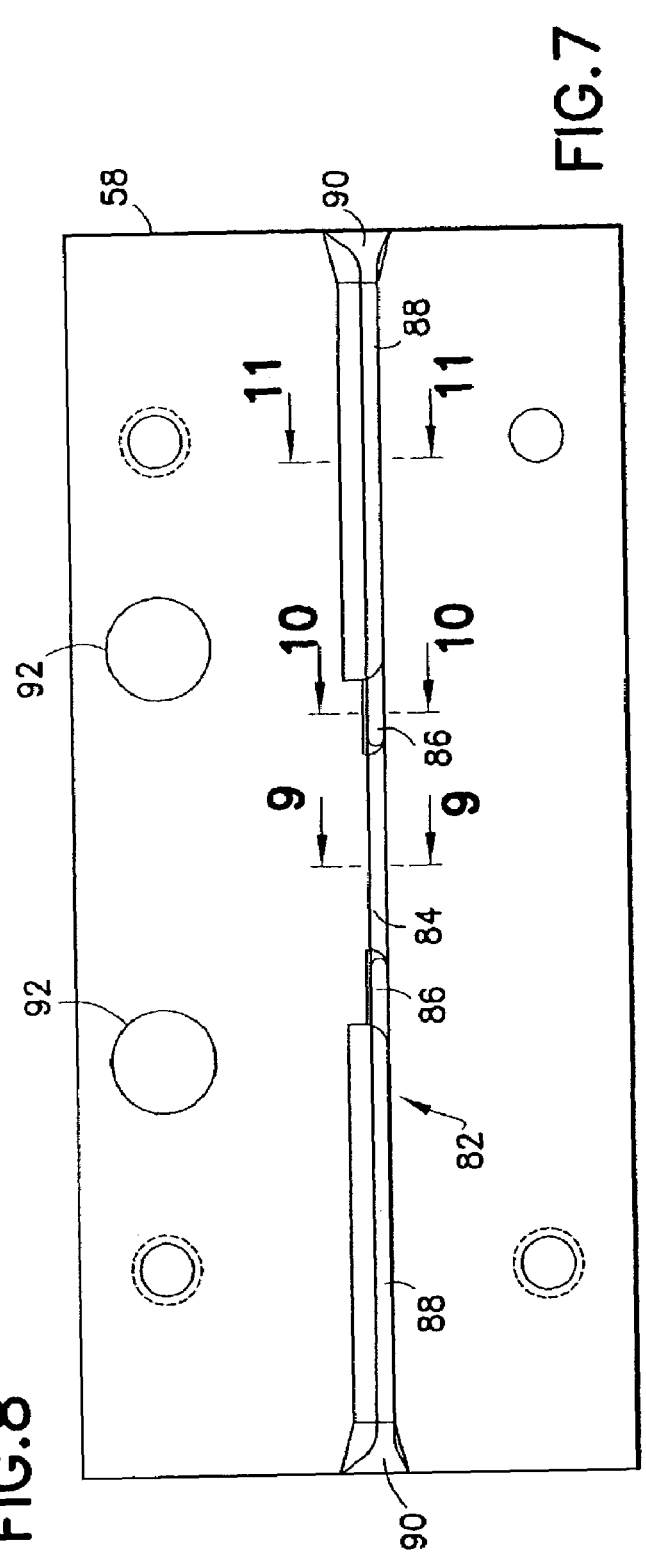

METHOD AND APPARATUS FOR SEALING FLANGES AND DEFORMING PROFILES OF PLASTIC ZIPPER

BACKGROUND OF THE INVENTION

This invention generally relates to methods and apparatus for manufacturing flexible zippers for use in reclosable pouches, bags or other packages. In particular, the invention relates to zippers having flanges or fins, by means of which the bag making film is attached to the zipper.

Reclosable bags are finding ever-growing acceptance as primary packaging, particularly as packaging for foodstuffs such as cereal, fresh vegetables, snacks and the like. Such bags provide the consumer with the ability to readily store, in a closed, if not sealed, package any unused portion of the packaged product even after the package is initially opened.

Reclosable fastener assemblies are useful for sealing thermoplastic pouches or bags. Such fastener assemblies often include a plastic zipper and a slider. Typically, the plastic zipper includes a pair of interlockable profiled members that form a closure. As the slider moves across the profiles, the profiles are opened or closed. The profiles in plastic zippers can take on various configurations, e.g. interlocking rib and groove elements having so-called male and female profiles, interlocking alternating hook-shaped closure members, etc. Reclosable bags having slider-operated zippers are generally more desirable to consumers than bags having zippers without sliders because the slider eliminates the need for the consumer to align the interlockable zipper profiles before causing those profiles to engage.

In addition, zippers can be differentiated by whether or not the zipper strips having flanges for attachment to the receptacle. When the zipper strips have flanges (also called "fins"), it is customary that the flanges are sealed at the respective ends of the zipper, adjacent the side seals in the bag.

Flattening sliderless zippers at the package ends is common. Flattening the zipper (sometimes called "presealing") prior to merging with the bag at a position corresponding to the package edge facilitates sealing the bag edges at the zipper. This is because the zipper is pre-flattened so that it is much easier to create a leak-resistant seal around the zipper edges.

In one type of slider-actuated zipper, the slider straddles the zipper and has a separating finger at one end that is inserted between the profiles to force them apart as the slider is moved along the zipper in an opening direction. The other end of the slider is sufficiently narrow to force the profiles into engagement and close the zipper when the slider is moved along the zipper in a closing direction. Other types of slider-operated zipper assemblies avoid the use of a separating finger. For example, U.S. Pat. No. 6,047,450 discloses a zipper comprising a pair of mutually interlockable profiled structures, portions of which form a fulcrum about which the profiled structures may be pivoted out of engagement when lower edges of the bases are forced towards each other.

One of the important features of zipper assemblies operated by sliders without separating fingers is the end stop, which prevents the clipped-on slider from falling off when the slider reaches the end of the fastener. A slider end stop is provided on each end of the zipper. End stops have taken on various configurations, such as, for example, riveted end clamps such as those described in U.S. Pat. Nos. 5,067,208 and 5,161,286; transverse end stops made from molten material of the fastener strips, as described in U.S. Pat. No. 5,088,971; tubular end stops, as described in U.S. Pat. No. 5,405,478; a window structure combined with sealed zipper ends, as described in U.S. Pat. No. 5,442,837; plastic end clips fused to the zipper, as described in U.S. Pat. No. 5,448,807; posts with enlarged heads that pass through the ends of the zipper profiles, as described in U.S. Pat. No. 5,924,173; plastic ribbon, monofilament or clip-shaped segments that conform to the outer shape of and are fused to the zipper profile, as described in U.S. Pat. No. 5,833,791

A slider end stop must be designed to withstand the force applied by a consumer during normal use. More specifically, as the consumer pulls the slider to either end of the zipper, the end stop should not bend, fold, collapse or otherwise lose its ability to stop the slider when the slider is pressed against the end stop with the pulling force being exerted by the consumer. Preferably a slider end stop has relatively high slider pull-off resistance.

In a known method of manufacture, both an ultrasonic or other shaping device and separate device for sealing the zipper flanges, e.g., by means of ultrasonics, hot bar sealer or other device, are used. This known method increases the cost and complexity of manufacture and increases the size of the overall equipment due to the presence of the additional equipment and the additional separation between devices required for packaging registration.

There is a need for improvements in the manufacture of reclosable bags having flanged zippers (with or without sliders). In particular, there is a need for reducing the cost of the equipment used to manufacture flanged zippers of the type wherein the ends of the zipper profiles need to be shaped (by deforming the plastic zipper material) and the ends of the zipper flanges need to be sealed (by fusing the plastic zipper material).

BRIEF DESCRIPTION OF THE INVENTION

The invention is directed, in part, to methods and apparatus for deforming the closure profiles of a flanged zipper for reclosable packaging and sealing the zipper flanges of the zipper below the zone of deformation. The functions can be performed in one operation or in separate operations, using either ultrasonic wave energy or the application of heat and pressure. In the case of slider-actuated zippers, the closure profiles should be deformed into a shape that blocks further travel of the slider and provides adequate slider pull-off resistance.

One aspect of the invention is an assembly comprising: a first zipper strip having a first zipper flange and a first closure profile; and a second zipper strip having a second zipper flange and a second closure profile that is interlocked with the first closure profile, the first and second zipper strips being fused to each other in zones spaced at regular intervals along a lengthwise direction, wherein each zone of fusion comprises a first area wherein the first and second closure profiles are fused to each other and deformed, and a second area wherein the first and second zipper flanges are fused to each other and deformed.

Another aspect of the invention is a package comprising a receptacle, and a zipper comprising first and second zipper strips joined to the receptacle, wherein the first zipper strip comprises a first zipper flange and a first closure profile, while the second zipper strip comprises a second zipper flange and a second closure profile, the first and second closure profiles having complementary shapes, and the first and second zipper strips being fused to each other in respective zones at the ends of the zipper, wherein each zone of fusion comprises a first area wherein the first and second closure profiles are fused to each other and deformed, and a second area wherein the first and second zipper flanges are fused to each other and deformed.

A further aspect of the invention is a method of manufacture comprising the following steps: extruding a first zipper strip comprising a first zipper flange and a first closure profile; extruding a second zipper strip comprising a second zipper flange and a second closure profile that is interlockable with the first closure profile; interlocking the first and second closure profiles; and welding the first and second zipper flanges together in a first zone and welding the first and second closure profiles together in a second zone by applying energy to both zones in one operation, the second zone being wider than the first zone, the widths of the first and second zones being measured along the length direction of the first and second zipper strips.

Yet another aspect of the invention is an apparatus for welding first and second extruded plastic zipper strips to each other, the first zipper strip comprising a first zipper flange and a first closure profile, and the second zipper strip comprising a second zipper flange and a second closure profile that is interlockable with the first closure profile. The apparatus comprises first and second tools, at least one of the first and second tools being movable relative to the other, the first tool comprising a first body and a first plurality of surface features confronting the second tool, and the second tool comprises a second body and a second plurality of surface features confronting the first tool when the first and second tools are brought into a mutually confronting relationship. The first and second pluralities of surface features, when heated and placed on opposing sides of mutually interlocked sections of the first and second zipper strips, weld the first and second zipper flanges together in a first zone and weld the first and second closure profiles together in a second zone. The second zone is wider than the first zone, the widths of the first and second zones being measured along the length direction of the first and second zipper strips.

A further aspect of the invention is an apparatus comprising an ultrasonic transducer, a horn coupled to the ultrasonic transducer and an anvil confronting the horn, wherein the horn comprises a plurality of surface features, and the anvil comprises first and second planar surfaces on opposing sides of a channel. Some of the surface features of the horn, in cooperation with one of the first and second planar surfaces of the anvil, shape the material of first and second closure profiles of first and second zipper strips respectively to form back-to-back slider end stops during activation of the horn, while other of the surface features of the horn, in cooperation with the other of the first and second planar surfaces of the anvil, weld together first and second zipper flanges of the first and second zipper strips respectively during horn activation.

Another aspect of the invention is a method of manufacturing a slider-zipper assembly for reclosable packaging, the zipper comprising a first zipper strip having a first zipper flange and a first closure profile, and a second zipper strip having a second zipper flange and a second closure profile that is interlocked with the first closure profile. The method comprises the following steps: (a) advancing the first and second zipper strips; (b) at regular intervals along the zipper, applying sufficient ultrasonic wave energy in a first zone of the zipper encompassing confronting portions of the first and second closure profiles to cause those confronting portions of the first and second closure profiles to merge; and at regular intervals along the zipper, applying sufficient ultrasonic wave energy in a second zone of the zipper encompassing confronting portions of the first and second zipper flanges to cause the confronting portions of the first and second zipper flanges to merge, wherein the second zone is contiguous with the first zone.

Yet another aspect of the invention is an apparatus for welding plastic parts, comprising first and second tools, at least one of the first and second tools being movable relative to the other, the first tool comprising a body and a plurality of surface features on one side of the body that generally project toward the second tool when the first and second tools are brought into a mutually confronting relationship. The surface features of the first tool comprise: an elongated plateau having a plurality of mutually parallel, spaced grooves defining lands therebetween, the lands comprising respective elongated front surfaces that are mutually coplanar in a first plane, and the grooves being parallel to a first axis; a plurality of projections arranged in a row with spaces therebetween, the row being generally disposed parallel to a second axis that is perpendicular to the first axis, the plateau being disposed on one side of the row of projections; and a dam disposed on the other side of the row of projections.

Other aspects of the invention are disclosed and claimed below.

BRIEF DESCRIPTION OF THE DRAWINGS

FIGS. 5 and 6 are fragmentary views, as indicated by jagged lines.

FIG. 7 is a drawing showing a top view of an anvil that can be used with the horn depicted in FIGS. 4–6.

FIG. 8 is a drawing showing an end view of the anvil depicted in FIG. 7, with a dowel pin inserted in a hole formed in the anvil.

FIGS. 9–11 are drawings showing cross-sectional views of the anvil depicted in FIG. 7, with the sections being taken along the lines respectively indicated by 9—9, 10—10 and 11—11 in FIG. 7.

[Note: FIGS. 1, 2 and 7–15 are taken from U.S. patent application Ser. No. 10/113,489 filed on Apr. 1, 2002 and entitled "Method and Apparatus for Ultrasonically Stomping Slider End Stops on Zipper".]

Reference will now be made to the drawings in which similar elements in different drawings bear the same reference numerals.

DETAILED DESCRIPTION OF THE INVENTION

Figure 1:
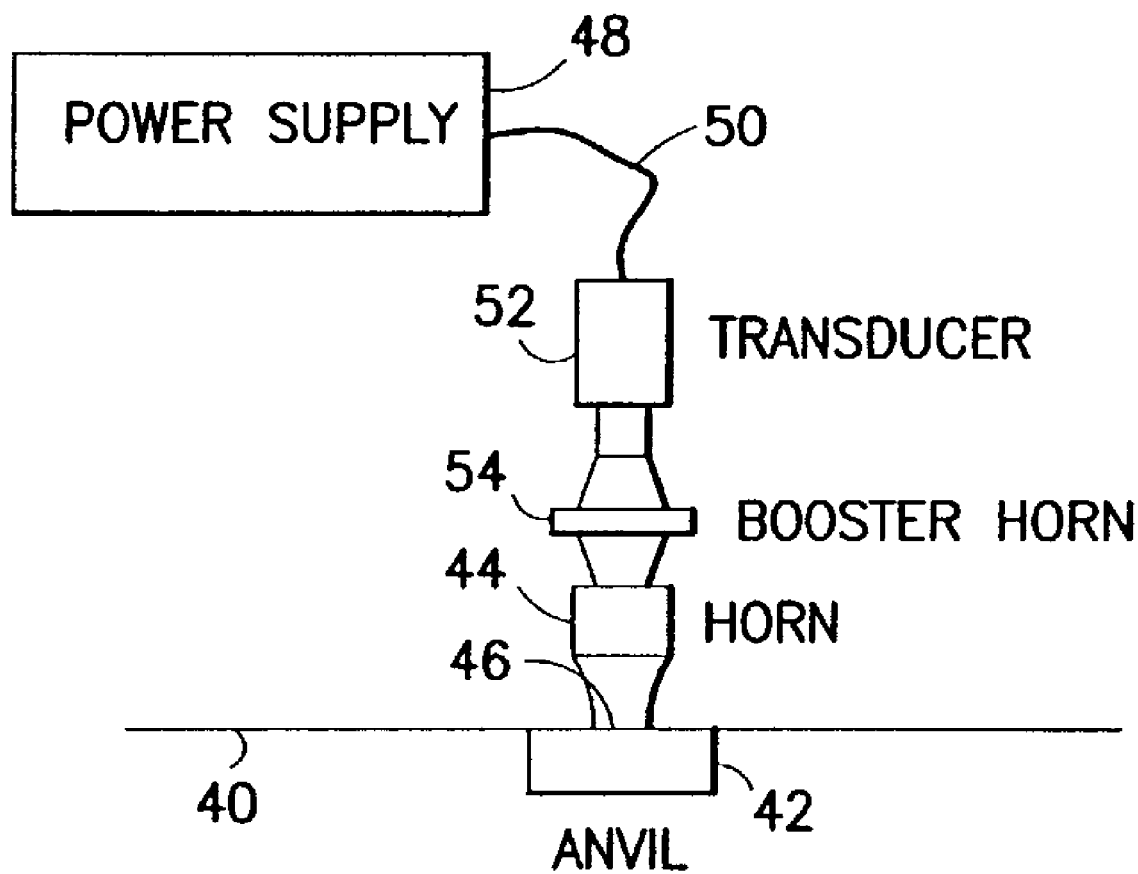
FIG. 1 is a drawing generally depicting a typical ultrasonic welding apparatus for welding thermoplastic material.

One aspect of the invention disclosed herein is a method for concurrently forming slider end stops and sealing zipper flanges at spaced intervals along a pair of interlocked flanged zipper strips unwound from a roll or spool. The flanged zipper strips are typically extruded so that they have a constant profile along their length. The zipper strips have complementary closure profiles and respective zipper flanges formed during the extrusion process. In the embodiment disclosed herein, the forming/sealing operation is carried out by applying ultrasonic wave energy to the zipper material. However, the invention is not limited to using ultrasonic wave energy and instead may use thermal or conduction heat sealing methods. Sufficient energy (ultrasonic or thermal) is applied to the zipper or closure profiles in a first zone and to the zipper flanges in a second zone to soften and merge the plastic material in both zones, the merged material forming a zone of fusion upon cooling. Each zone of fusion has a plane of symmetry, the planes of symmetry being spaced along the zipper at intervals equal to one package length. Each zone of fusion is also shaped to form a pair of slider end stops that are joined at their backs until when the zipper is cut along the plane of symmetry in the bag making machine, as described in detail below.

A further aspect of the invention is performing the same operations described in the preceding paragraph, except for a sliderless flanged zipper. In this case the closure profiles are deformed and fused to form zipper preseals instead of slider end stops. As previously described, "presealing" involves flattening the zipper prior to merging with the bag film at a position corresponding to the package edge. The presealing operation facilitates sealing the bag edges at the zipper.

In one slider-actuated embodiment, the interlocked zipper strips are advanced intermittently and then the forming/sealing operation is repeated during each dwell time between successive advancements. Typically, sliders are inserted at a station downstream from the ultrasonic stomping station. The resulting slider-zipper assembly comprises a chain of connected zipper length, each zipper length having a respective slider. This chain can be wound on a spool for storage or transport, or the chain can be fed directly to a bag making machine.

One known bag making machine forms reclosable bags by folding a web of bag making film as the film is advanced in intermittent fashion through various station. At the same time, the zipper (with or without sliders) is fed in synchronism with the advancing web, one package length at a time. The zipper flanges are placed between the edges of the folded film and joined to the film, typically by a conduction heat sealing process. A separate bag is formed by cutting the zipper and film along a transverse line that bisects a zone of fusion in the zipper. The film is sealed on either side of that transverse line either before or during cutting (in the latter case, by use of a hot cutting knife), thus forming a receptacle having a zipper in its mouth. The zipper with zones of fusion and shaping can also be used in other types of bag making machines.

The bag making film may consist of various types of thermoplastic material, such as low-density polyethylene, substantially linear copolymers of ethylene and a C3–C8 alpha-olefin, polypropylene, polyvinylidene chloride, mixtures of two or more of these polymers, or mixtures of one of these polymers with another thermoplastic polymer. The person skilled in the art will recognize that this list of suitable materials is not exhaustive. The bag material may be either transparent or opaque. Optionally, the bag may be provided with an enclosed header that encompasses the zipper and the slider.

At its top end, the bag has an openable mouth, on the inside of which is an extruded plastic zipper. The zipper comprises a pair of interlockable zipper strips 24 and 26 (best seen in FIG. 2) having respective flanges 28 and 30 extending from the closure profiles. Although FIG. 3 shows a rib and groove arrangement, the closure profiles of the zipper strips may take any form. For example, the zipper may comprise interlocking rib and groove elements or alternating hook-shaped closure elements. The preferred zipper material is polyethylene.

A slider-actuated zipper in accordance with one embodiment of the invention will now be described in detail. However, it should be remembered that the concept of deforming the closure profiles and sealing the zipper flanges at regular intervals also has application in the manufacture of reclosable bags having sliderless zippers.

In accordance with some embodiments of the invention, the slider for opening or closing the reclosable zipper is generally shaped so that the slider straddles the zipper profiles. The slider may be made in multiple parts and welded together or the parts may be constructed to be snapped together. The slider may also be of one-piece construction. The slider can be made using any desired method, such as injection molding. The slider can be molded from any suitable plastic, such as nylon, polypropylene, polystyrene, acetal, polyketone, polybutylene terephthalate, high-density polyethylene, polycarbonate, or ABS.

In accordance with some embodiments of the invention, the zones of fusion on the zipper are formed by application of ultrasonic wave energy. Welding and sealing of thermoplastic material by ultrasonic vibrations is an established process and has been used for forming slider end stops on the ends of a slider-operated zipper in a reclosable package. FIG. 1 shows a typical ultrasonic welding apparatus in which a workpiece 40 is fed through an ultrasonic weld station comprising an anvil 42 and an oppositely disposed resonant horn 44. The frontal surface 46 of the horn 44 and the anvil 42 are urged toward mutual engagement by force means, not shown, for causing the horn to be in forced contact with the workpiece for coupling the ultrasonic vibrations into the material, thereby effecting ultrasonic welding. The horn 44 is energized from a power supply 48 that provides electrical high-frequency power at a predetermined ultrasonic frequency via a cable 50 to an electroacoustic transducer 52, which, in turn, provides mechanical vibrations at that frequency to a booster or coupling horn 54 for coupling these vibrations to the horn 44. The horns 44 and 54 and the transducer 52 are dimensioned to be mechanically resonant longitudinally at the predetermined frequency. This combination of components forming an ultrasonic welding apparatus is well known to those skilled in the art.

The present invention is directed in part to apparatus for welding zipper for reclosable packaging at spaced intervals. In each welding zone, the closure profiles are merged and impressed to form zipper preseals or slider end stop structures and the zipper flanges are sealed together in either case. However, the person skilled in the art will recognize that the apparatus could be used to shape and weld sections of workpieces other than zippers for reclosable packaging.

Figure 2:
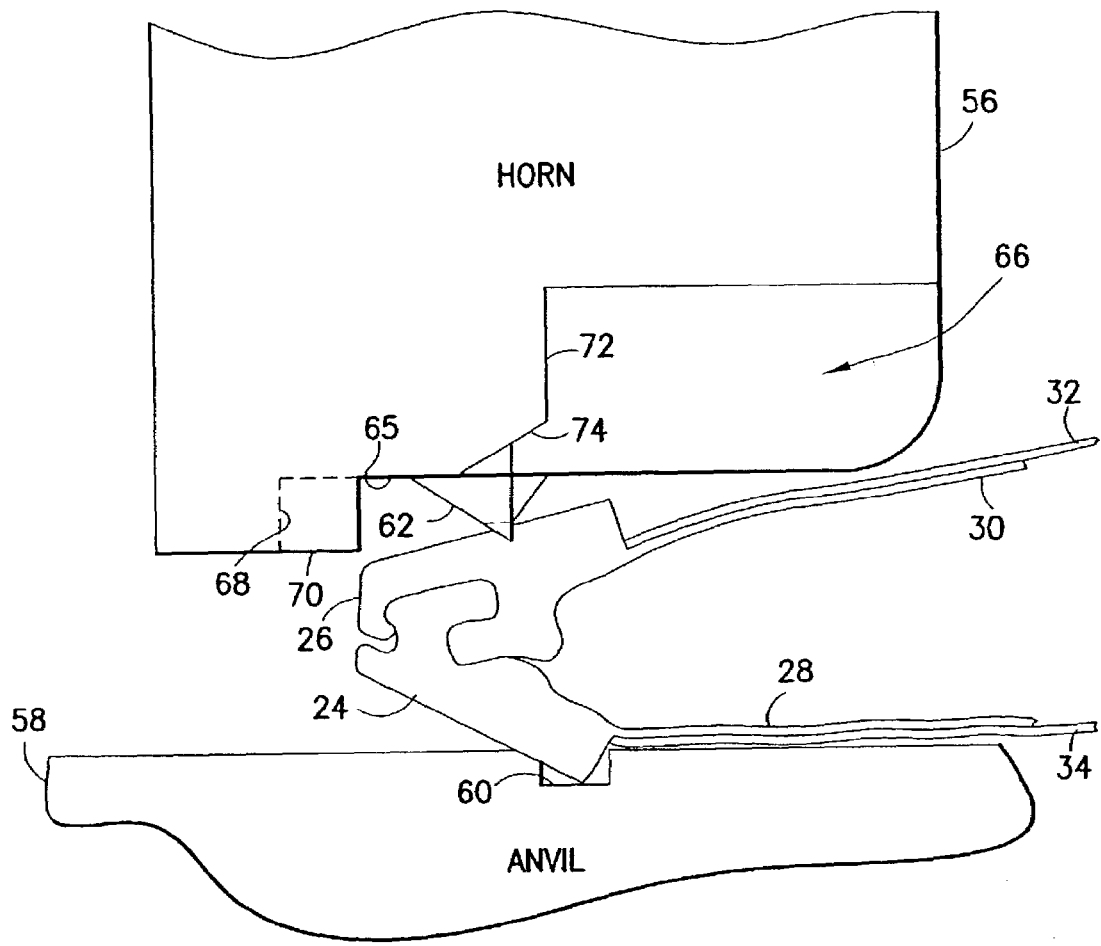
FIG. 2 is a drawing showing an end view of a zipper sandwiched between a known horn-and-anvil combination at the start of an ultrasonic stomping operation.
Figure 3:
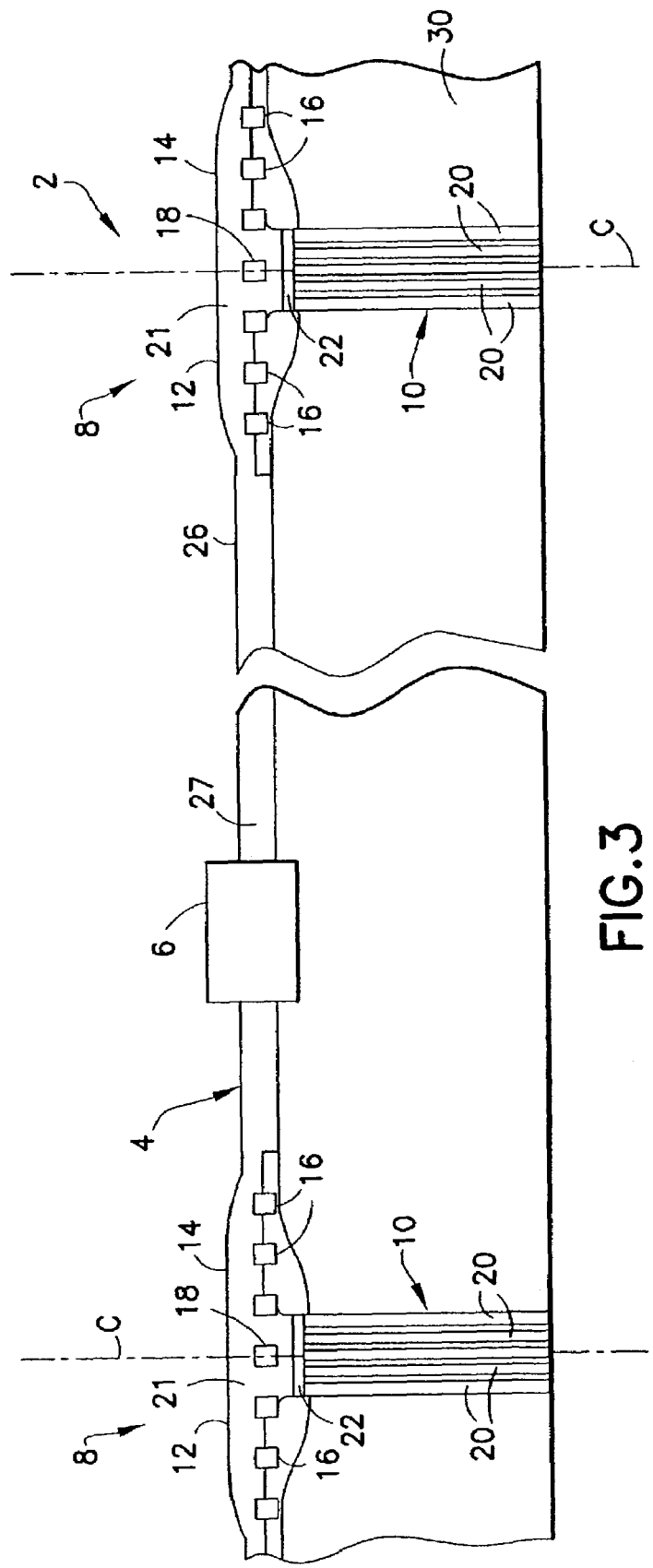
FIG. 3 is a drawing showing a front view of a portion of an ultrasonically stomped slider-zipper assembly in accordance with one embodiment of the present invention.

The horn and anvil of a known ultrasonic welding apparatus is depicted in FIG. 2. This apparatus was specifically designed so that the ultrasonic stomping operation would accomplish at least some of the following goals: create a vertical hump on the zipper to stop the slider; preserve the base of the zipper profile to resist pull-off of the slider; penetrate the heat into the mass of the zipper profile in the end stop areas and melt the hooks of the zipper profiles to each other and into the base; prevent the zipper from opening or shifting during stomping; direct the flow of the molten plastic upward toward the hump-stop at the ends of the stomp; control the heat of the plastic to prevent hot spots that cause holes in the bag and prevent the flange attachment from burning, away from the base of the zipper; and guiding/locating the zipper in the stomper.

Referring to FIG. 2, this known ultrasonic welding apparatus comprises a horn 56 and an anvil 58, which are brought together with the flexible zipper of a reclosable package therebetween. The anvil 58 comprises a slot 60 in which a portion of one zipper strip, e.g., zipper strip 24 having a male profile, is inserted, while the horn comprises a plurality of teeth 62, which penetrate into the mass of thermoplastic material forming the zipper strip 26 having a female profile. Although placing the zipper strip with the female next to the horn is preferred, this is not mandatory. During the ultrasonic stomping procedure, the horn 56 is displaced downward and toward the stationary anvil 58. FIG. 2 shows the horn 56 in a position whereat the teeth 62 have just come into contact with the zipper strip 26. The horn is activated to couple ultrasonic waves into the zipper material while applying pressure. As a result, portions of the zipper strips 24 and 26 will be deformed and flattened, with indentations being formed in the flattened thermoplastic material by the teeth 62. The portion of the zipper strips that is flattened is determined by the extent of the flattening surface 65 of the horn 56. As seen in FIG. 2, the horn has a recess 66 where no flattening occurs, i.e., the base portions or rails of the zipper strips 24 and 26 are left undisturbed. Preferably, the boundary 72 of the recess 66 is generally aligned with the left-hand (as seen in FIG. 2) wall of the slot 60 in the anvil 58. The horn 56 further comprises a beveled surface 74 having a juncture with wall 72 and a juncture with the flattening surface 65.

An additional structural feature seen in FIG. 2 is a rail 68 that projects downward of the flattening surface 65. The rail 68 serves as a dam for blocking and deflecting the flow of thermoplastic material across the flattening surface during the ultrasonic stomping operation. The confronting wall 68 of the dam is represented by a dashed line in FIG. 2 because it is hidden behind a side rail 70 from the vantage shown in FIG. 2.

The horn depicted in FIG. 2 is not designed to seal the zipper flanges 28 and 30 to each other during slider end stop formation. FIG. 2 shows the opposing walls 32 and 34 of a receptacle joined to the outer surfaces of respective zipper flanges 30 and 28.

In the embodiment of the invention disclosed herein, slider end stops are formed and the zipper flanges are sealed before the zipper is joined to film in a bag making machine. A section of a slider-zipper assembly in accordance with one embodiment of the invention is depicted in FIG. 3. The assembly 2 comprises a zipper 4 having a multiplicity of sliders 6 (only one of which is shown in FIG. 3) mounted thereon. Each slider 6 is of the straddling type, i.e., the slider has no separating finger and thus requires that end stops be provided at the ends of each zipper section. The zipper 4 may comprises a pair of zipper strips of the type shown in FIG. 2. In the view of FIG. 3, only the zipper strip 26 is visible. The zipper strip 26 is formed by extrusion of plastic material and comprises a closure profile 27 and a zipper flange 30. The other zipper strip (behind zipper strip 26 in FIG. 3) also comprises a closure profile and a zipper flange, the closure profiles of the two zipper strips having complementary (i.e., interlocking) shapes.

In the embodiment partially depicted in FIG. 3, a multiplicity of zones 8 of fused zipper material are formed, at spaced intervals along a lengthwise direction, by the application of heat and pressure on the zipper material. The heat may be generated by the application of ultrasound wave energy. Each zone of fusion 8 is generally T-shaped. Each slider is mounted to a respective unfused section disposed between successive zones of fusion. Each zone of fusion 8 comprises a first area wherein the closure profiles of the interlocked zipper strips are fused to each other and deformed, and a second area wherein the zipper flanges of the interlocked zipper strips are fused to each other and deformed.

The aforementioned first area of the zone of fusion extends in the lengthwise direction and forms the top of the T shape. During the forming/sealing operation, some of the plastic material of the zipper profiles is deformed and pushed upward to form the extended hump seen in FIG. 3. Also, some of the plastic material of the zipper profiles in the zone of fusion is deformed and pushed downward. In the forming process, a generally flattened surface 21 is formed in each zone of fusion 8. In addition, a row of spaced indentations is formed on one side of the zone of fusion 8 in the first area where the profiles are fused. A central indentation 18 is disposed along a plane of symmetry of the zone of fusion 8, which is indicated by the dashed line designated by the letter "C" in FIG. 3. Other indentations (in this example, three on each side of the central indentation) are formed along a line generally perpendicular to line C, as seen in FIG. 3. The perimeter at the entrance to each indentation is generally rectangular, while the interior volume of each indentation 16 is generally prism-shaped. The interior volume of the central indentation 18 is generally in the shape of a truncated prism. These indentations are impressed on only one side of the zipper by respective projections on the ultrasonic horn to be described in detail hereinafter.

When the zipper is later cut along line C, the first area comprising deformed and fused zipper profiles form respective slider end stops 12 and 18 on separate packages. In this sense, the first area of the zone of fusion comprises back-to-back end stops. These end stops prevent the slider from sliding off the ends of the zipper when the slider reaches the closed or fully opened position. Such end stops perform dual functions, serving as stops to prevent the slider from going off the end of the zipper and also holding the two zipper profiles together to prevent the bag from opening in response to stresses applied to the profiles through normal use of the bag.

The aforementioned second area of the zone of fusion 8 extends transverse to the lengthwise direction and forms the stem of the T shape. During the forming/sealing operation, some of the plastic material of the zipper flanges is deformed and merged to form a flange seal 10. The flange seal 10 comprises an array of mutually parallel spaced grooves 20, which array is generally parallel to the line C. These grooves 20 are impressed on the same side of the zipper that the above-described indentations are formed. The grooves and indentations are formed and the surface 21 is flattened in one operation. A generally planar transitional surface 22 is also formed between the flattened surface 21 and the flange seal 10.

Figure 4:
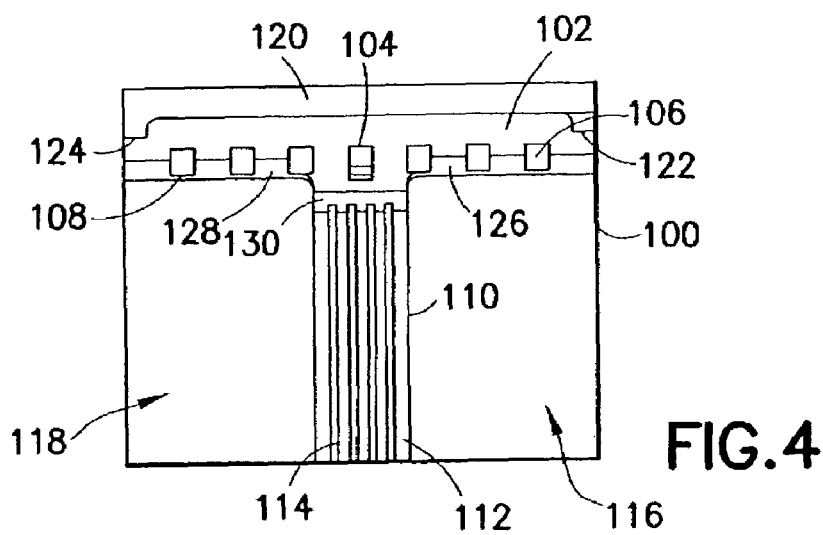
FIGS. 4–6 are drawings respectively showing three views, taken from mutually orthogonal directions, of a horn that can be used to produce the zipper ends depicted in FIG. 3.

The horn 100 in accordance with one embodiment of the invention will now be described with reference to FIGS. 4–6. This horn design has a rectangular shape with a minimum size footprint in order to maximize the focus of the ultrasonic wave energy at high bag line speeds. As seen in FIG. 4, the face of the horn 100 that confronts the anvil has a generally planar flattening surface 102. When the horn is installed in the ultrasonic welding apparatus, the flattening surface 102 is substantially perpendicular to the direction of horn displacement and generally parallel to the opposing face of the anvil.

The horn 100 is further provided with a multiplicity of teeth arranged in a line at spaced intervals. In this embodiment, two types of teeth are shown. A tooth 104 occupies a central position in the line of teeth, while respective trios of teeth 106 and 106 occupy flanking sections of the line on opposite sides of the central tooth 104.

Each tooth 106 has a prismatic shape with an inclined surface and three side wall surfaces, each of the three side walls being perpendicular to the flattening surface 102, while the inclined surface is inclined at an angle of 30 degrees relative to the flattening surface. The profile of each tooth 106 can be seen in FIG. 6. The inclined surface of each tooth 106 is rectangular, as seen in FIG. 4.

Figure 5:
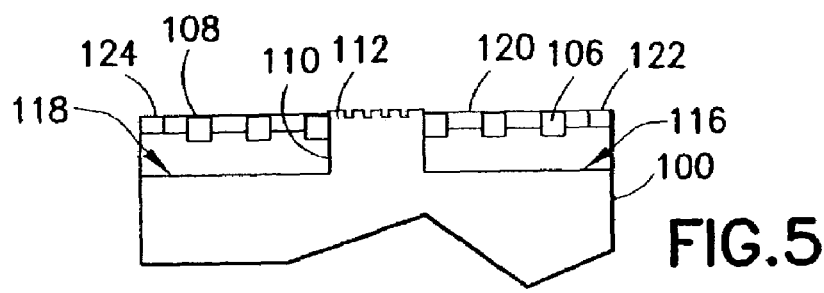
Figure 6:
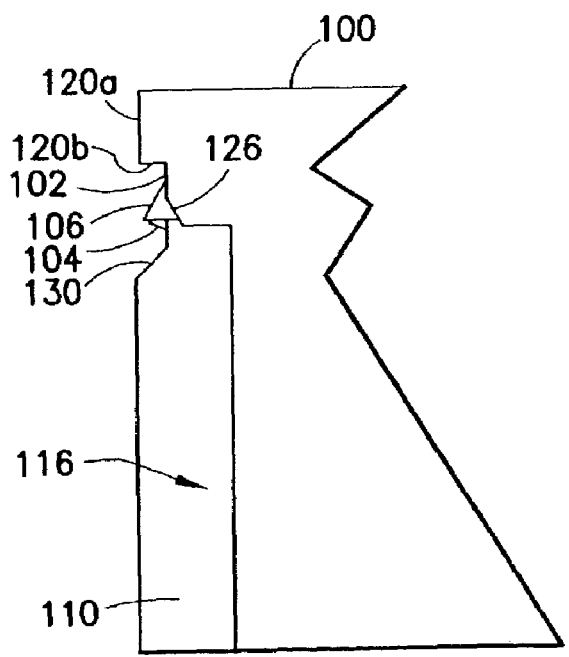
Figure 12:
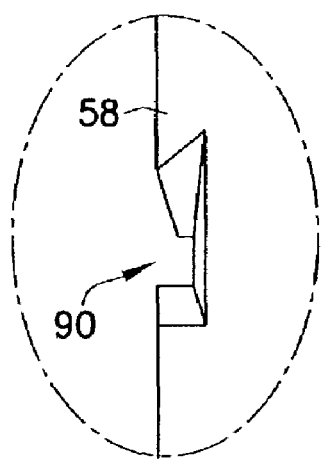
FIG. 12 is a drawing showing a magnified view of the area indicated by reference numeral 12 in FIG. 8.

The central tooth 104 has the same width (i.e., distance between parallel side walls) as the width of teeth 106, but a different length (as seen in FIG. 4) and a different geometry, as partly seen in FIG. 6 (where part of tooth 104 is visible behind a tooth 106 as seen from the side). In the embodiment shown in FIGS. 3–6, tooth 104 has the shape of a truncated prism. More specifically, tooth 104 has two inclined surfaces separated by an end facet (these three surfaces can be seen in FIG. 4) and two mutually parallel side wall surfaces, each of the two side walls being perpendicular to the flattening surface 102, while one inclined surface is inclined at an angle of 30 degrees relative to the flattening surface 102 and the other inclined surface is inclined at an angle of 60 degrees relative to the flattening surface 102. The side profile of tooth 104 is a trapezoid. The end facet of tooth 104 is preferably parallel to the flattening surface.

The teeth act as vertical energy directors to penetrate the heat into the center of the zipper directly into the fulcrum area of the profiles. The greatest amount of welded zipper material will be produced in the locations penetrated by teeth, so the teeth need to be properly positioned vis-à-vis the zipper. Also, due to the high cycle rate of the stomping requirement, it is important to get the heat into the center of the zipper material mass as soon as possible. Also the peaked teeth 106 help keep the zipper aligned during the stomping operation as the teeth 106 heat and penetrate the outside of the profile. The teeth 106 keep the zipper from rocking open and disengaging during the stomping. Alternating teeth can be positioned on both the horn and anvil, but teeth on the horn are preferred because the zipper is more stable and keeps better alignment as the horn and anvil come together.

The rectangular horn 100 further comprises a rail 120 along the top at a special depth and location to trap the top of the zipper material as it melts and flows outward during stomping and acts as a dam when the female profile is up against the horn. If the female profile is down, the dam could be on the anvil. The sides of the dam, i.e., side rails 122 and 124, assist in abruptly shaping the melted thermoplastic zipper material and packing it up into this area. In the final product, this abrupt shape acts as an improved stop for the slider to bump against, which increases the pull-off force. Optionally, a projection in the shape of a so-called "widow's peak" can be incorporated in the dam to redirect thermoplastic material from the middle of the anvil and toward the starting point of the end stop, thereby improving pull-off resistance. For example, the profile of the widow's peak may be an inverted trapezoid with side walls inclined at 45 degree angles.

The horn 100 further comprises an extended section for sealing the zipper flanges in an area below the area where the profiles are shaped and fused. This extended section (see FIGS. 4–6) comprises an elongated plateau 110 having a plurality of mutually parallel, spaced grooves 114 defining lands 112 therebetween. The plateau is flanked on opposing sides by respective recesses 116 and 118. The lands 112 of plateau 110 comprise respective elongated front surfaces that are mutually coplanar in a plane, while the array of grooves 114 is generally transverse to the line or row of spaced projections. During the ultrasonic shaping/sealing operation, the extended section presses the zipper flanges against an opposing flat surface on the anvil, thus forming the grooved flange seal area 10, shown in FIG. 3 and previously described.

Figure 16:
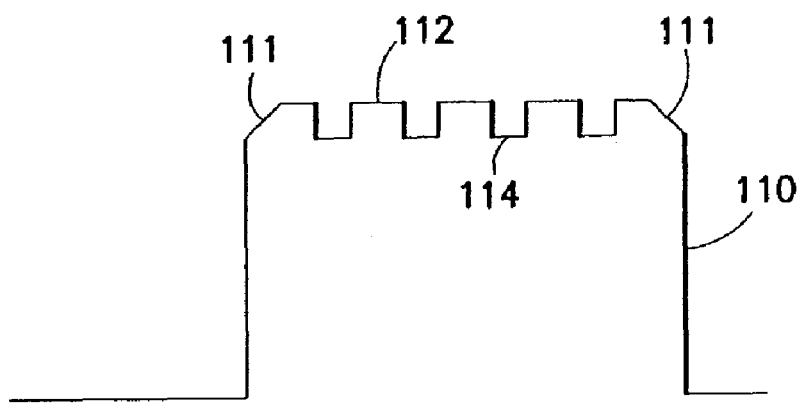
FIG. 16 is a drawing showing a land-groove profile of the ultrasonic horn.

The flange sealing provides resistance to package leakage and also improves package strength by reinforcing the side welds. The vertical grooves 20 depicted in FIG. 3 will tend to resist horizontal leakage better than vertical leakage. Conversely, the grooves could be formed orthogonal to the vertical direction, in which case the grooves would tend to resist vertical leakage better than horizontal leakage. Optionally, the corners of the plateau 110 may be beveled as shown in FIG. 16, the beveled corners being designated by numeral 111. The beveled corners on the plateau mitigate the tendency for the zipper flanges to tear at the boundaries of the sealed and unsealed zones of the zipper flanges.

The alternating land-groove profile of the plateau is clearly seen in FIG. 16. The grooves provide recesses for the molten plastic material to flow into while the lands enable acoustic coupling along a convoluted interface with increased area as compared to a flat surface. This increases the efficiency of the transfer of energy into the zipper flanges. The projections on the face of the plateau could have shapes other than bar-shaped lands. For example, the projections could be pyramidal in shape. Alternatively, the face of the plateau could be knurled or dimpled.

Referring now to FIG. 6, the dam 120 has a planar front surface 120a and a side surface 120b. The front surface 120a lies in a plane that is rearward of the plane in which the front surfaces of lands 112 of plateau 110 are disposed. The side surface 120b meets the flattening surface 102 at a junction disposed on one side of the row of projections and is generally perpendicular to the flattening surface. The front surface 120a of the dam is generally parallel to and forward of the flattening surface 102. The plane of the land front surfaces is slightly forward of the plane defined by the front surface 120a (see FIG. 6) of the dam. One inclined planar surface 126 (best seen in FIG. 6) forms a bevel having collinear junctions with the flattening surface 102 in the area of projections 106, while another inclined planar surface 128 (coplanar with surface 126) forms a bevel having collinear junctions with the flattening surface 102 in the area of projections 108 (see FIG. 4). Another planar inclined surface 130 (best seen in FIG. 6) forms a bevel having a junction with the flattening surface 102 and having collinear junctions with the front surfaces of lands 112 on the plateau 110.

A known anvil (shown in FIGS. 7–12) can be used with the horn depicted in FIGS. 4–6. As seen in FIG. 7, the anvil 58 has a rectangular shape with a recess or slot (generally indicated by arrow 82) of varying cross-sectional profile extending in a longitudinal direction across the surface of the anvil. The recess or slot 82 across the tooling preserves the base of the zipper profiles across the entire length of the ultrasonic stomp. This slot or recess also removes the clamping force along the bottom of the length of the base where the flange attaches to the zipper profile. The slot or recess 82 in the anvil (whether full or partial in length) acts as a guide to prevent the zipper from sliding or shifting out from under the horn during welding due to the side forces caused by the angle of the wedge-shaped zipper seen in FIG. 2. The slot in the anvil (whether full or partial in length) also relieves the clamping force at the base of the wedge shape and helps prevent the zipper from opening during crushing. If the zipper rocks open during stomping, it can become misaligned and the slider will not stay activated properly at the park position, becoming deactivated. For this reason, the preferred way to stomp the: profile is with the male profile down against the anvil.

Another way to prevent the wedge-shaped zipper from rocking/pivoting open during the stomping procedure is to heat one of the legs of the profile, either directly or through the anvil or horn, in order to minimize its bend strength. For example, a cartridge heater can be inserted in a recess formed in the anvil underneath the surface opposing the horn to assist in pre-heating the zipper in the stopped position and adding to the heating during ultrasonic stomping.

Figure 15:
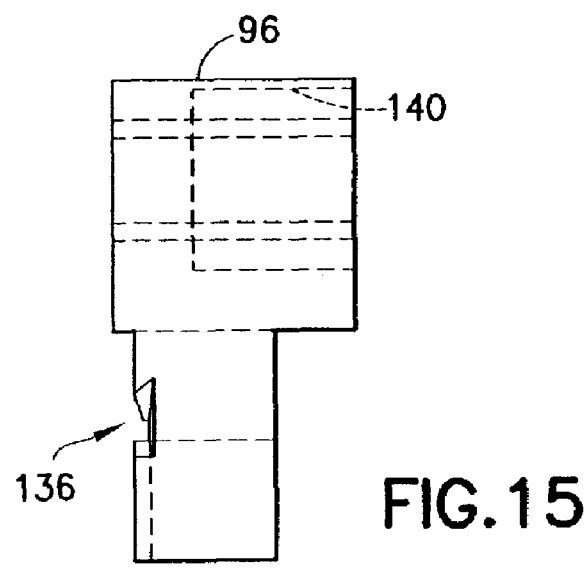
FIGS. 13–15 are drawings showing bottom, front and end views of an anvil cover designed for use with the anvil depicted in FIGS. 7–12.
Figure 13:
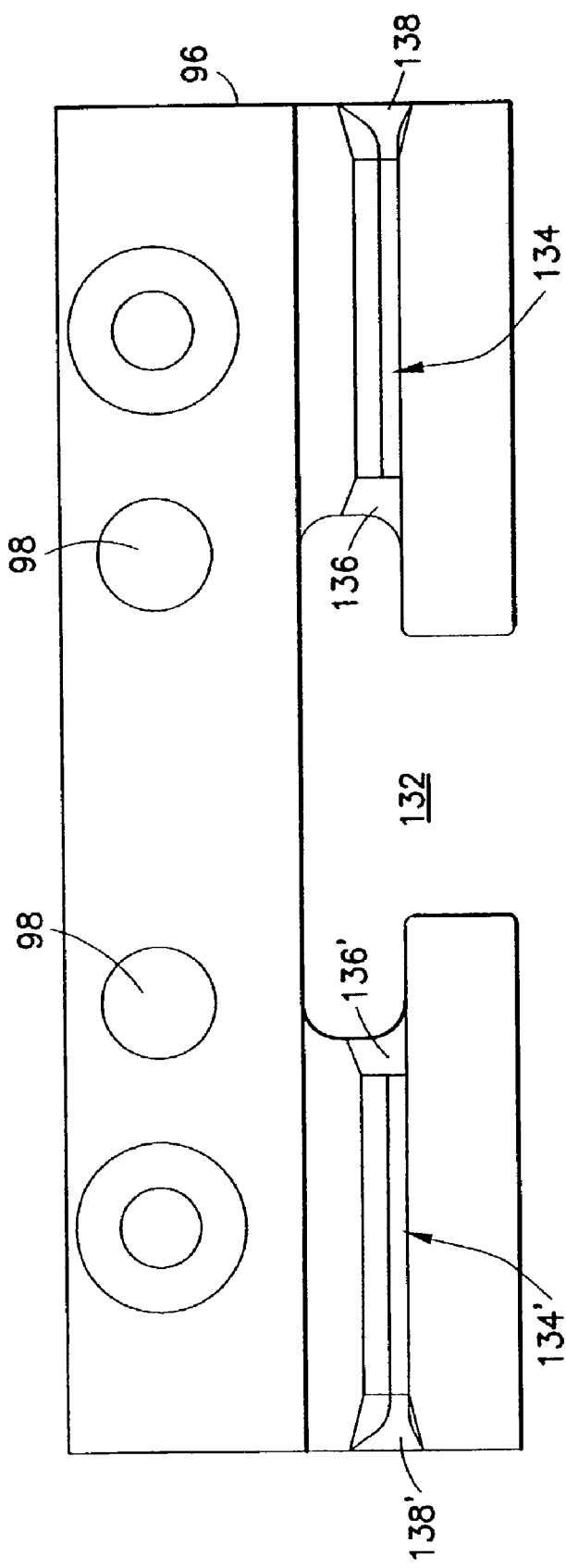
Figure 14:
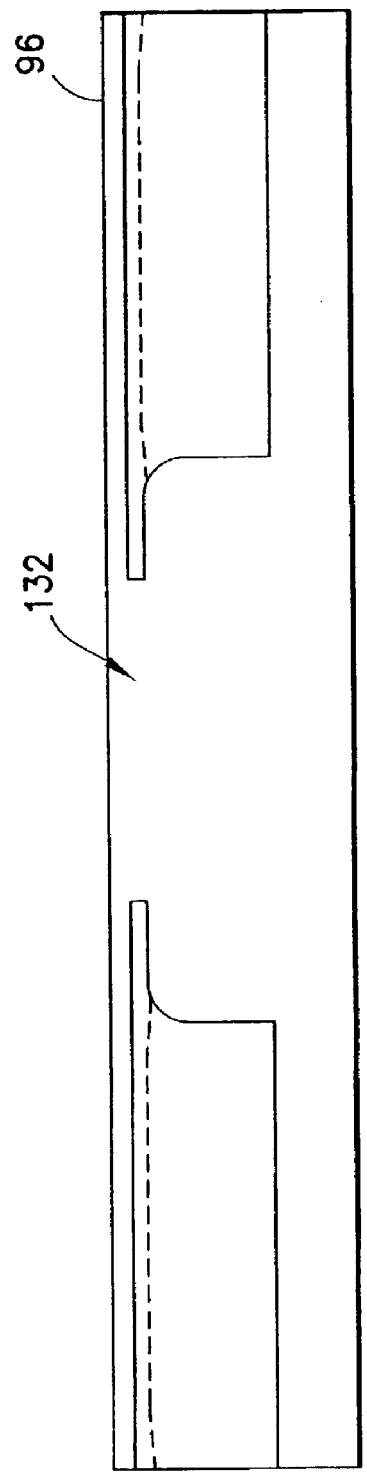

In accordance with one embodiment of the invention, an anvil cover is placed over the anvil. One embodiment of an anvil cover 96 is depicted in FIGS. 13–15. The anvil cover has a T-shaped cutout 132 (best seen in FIG. 13) that is shaped to allow the T-shaped flattening surface of the horn to pass through and close with the anvil. The bottom surface of the anvil cover, which opposes the anvil surface shown in FIG. 7, is shown in FIG. 13. As seen therein, the anvil cover has a recess or slot 134 that overlies one portion of the recess or slot (82 in FIG. 7) formed in the anvil and a recess or slot 134' that overlies another portion of the recess or slot in the anvil. The slots 134, 134' in the anvil cover, in combination with slot 82 in the anvil, form a passageway for the zipper to slide through.

The cross-sectional profile of slot 82 in the anvil 58 changes as seen in FIGS. 9–12. Slot sections 84 (see FIG. 9) in the anvil have a rectangular profile; slot sections 86 (see FIG. 10) in the anvil have a rectangular profile with a slight bevel on one side; slot sections 88 (see FIG. 11) in the anvil have a rectangular profile with a larger bevel on one side; and the slot end sections 90 (see FIG. 12) comprise three converging surfaces. The angled slot end sections 90 at the outer edges of the extended anvil and the angled slot end sections 138, 138' at the outer edges of slots 134, 134' of the anvil cover 96 act as built-in zipper guides that provide improved guidance and keep the zipper from pivoting. The inner edges 136, 136', where the anvil cover is cut-out, act as guides to keep the base of the profile aligned and to prevent the base from squeezing out toward the flange when the stomping process starts. They also help the teeth keep the zipper base in position during stomping.

The anvil and anvil cover are fastened together by spring-loaded bolts (not shown). Proper alignment of the cover with the anvil is ensured by a pair of dowel pins 94, only one of which is shown in FIG. 8. Holes 92 (see FIG. 7) are provided in the anvil for receiving one portion of the dowel pins, while holes 98 are provided in the anvil cover for receiving another portion of the dowel pins. The distance separating the centers of holes 92 in the anvil equals the distance separating the centers of holes 98 in the anvil cover. Alternatively, the anvil cover may incorporate a key that matches a keyway formed in the anvil to guarantee the alignment of components during stomping. The cover also contains a seat 140 (see FIG. 15) configured to receive a heavy-duty spring and bolt that hold the cover closed properly on the zipper. Optionally, ergonomic levers (not shown) can be used to unload the springs while threading the zippered film through the stomping assembly.

Although the disclosed embodiment of the ultrasonic horn has a row of spaced teeth, the teeth need not be arranged in a line. For example, the teeth can be staggered. Nor must the teeth be shaped to leave a square of rectangular indentation. The indentations formed in the flattened zipper stomp area can be spots having other geometries, e.g., circular or elliptical. Since ultrasonic energy directors are needed most where the zipper material is thickest, the teeth are placed so as to not form indentations near the peak of the zipper, where the zipper has minimal width.

Furthermore, although the disclosed embodiment applies ultrasound wave energy to the zipper profiles and flanges at one station using one horn-anvil setup, these steps could be performed at different stations using respective horn-anvil setups. In this event, the horn at one station would have the surface features that form the profiles into zipper preseals or slider end stop structures, while the horn at the other station would have the surface features that seal the zipper flanges together.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments failing within the scope of the appended claims.

As used in the claims, the term "package" means a container, bag, pouch or other receptacle for objects, material or stuff. A container, bag, pouch or other receptacle is deemed to be a package even if not yet packed with objects, material or stuff. As used in the claims, the verb "joined" means fused, bonded, sealed, adhered, etc., whether by application of heat and/or pressure, application of ultrasonic energy, application of a layer of adhesive material or bonding agent, interposition of an adhesive or bonding strip, etc. As used in the claims, the term "upward" means the direction generally directed from the bottom edge of the zipper flanges to the top of the closure profiles.

What is claimed is:

1. An apparatus for welding first and second extruded plastic zipper strips to each other, said first zipper strip comprising a first zipper flange and a first closure profile, and said second zipper strip comprising a second zipper flange and a second closure profile that is interlockable with said first closure profile, said apparatus comprising first and second tools, at least one of said first and second tools being movable relative to the other, said first tool comprising a first body and a first plurality of surface features confronting said second tool, and said second tool comprises a second body and a second plurality of surface features confronting said first tool when said first and second tools are brought into a mutually confronting relationship, wherein said first and second pluralities of surface features, when heated and placed on opposing sides of mutually interlocked sections of said first and second zipper strips, weld said first and second zipper flanges together in a first zone and weld said first and second closure profiles together in a second zone, said second zone being wider than said first zone, the widths of said first and second zones being measured along the length direction of said first and second zipper strips.

2. The apparatus as recited in claim 1, wherein said first and second zones are contiguous.

3. The apparatus as recited in claim 2, wherein said first and second zones form a T shape, said first zone being the stem of said T and said second zone forming the arms of said T.

4. The apparatus as recited in claim 1, wherein said first plurality of surface features comprise an array of spaced lands that impress an array of spaced grooves in said second zone on one side of said welded first and second zipper flanges.

5. The apparatus as recited in claim 1, wherein said first plurality of surface features comprise grooves, dimples or knurls.

6. The apparatus as recited in claim 1, wherein said first plurality of surface features comprise a rail shaped to serve as a dam for upward-flowing thermoplastic material.

7. The apparatus as recited in claim 1, wherein said first tool is coupled to a source of ultrasonic wave energy.

8. The apparatus as recited in claim 7, wherein said second tool comprises an anvil, further comprising an anvil cover overlying opposing portions of said anvil and comprising a T-shaped cutout, wherein said first plurality of surface features of said first tool fit in said T-shaped cutout of said anvil cover.

9. An apparatus comprising an ultrasonic transducer, a horn coupled to said ultrasonic transducer and an anvil confronting said horn, wherein said horn comprises a plurality of surface features, and said anvil comprises first and second planar surfaces on opposing sides of a channel, some of said surface features of said horn, in cooperation with one of said first and second planar surfaces of said anvil, shaping the material of first and second closure profiles of first and second zipper strips respectively to form back-to-back slider end stops during activation of said horn, while other of said surface features of said horn, in cooperation with the other of said first and second planar surfaces of said anvil, weld together first and second zipper flanges of said first and second zipper strips respectively during said activation of said horn.

10. The apparatus as recited in claim 9, wherein said other surface features of said horn comprise an elongated plateau having a plurality of mutually parallel, spaced grooves defining lands therebetween, said lands comprising respective elongated front surfaces that are mutually coplanar in a first plane, and said grooves being parallel to a first axis.

11. The apparatus as recited in claim 10, wherein said some surface features of said horn comprise a plurality of projections arranged in a row with spaces therebetween, said row being generally disposed parallel to a second axis that is perpendicular to said first axis, said plateau being disposed on one side of said row of projections.

12. The apparatus as recited in claim 11, wherein said some surface features of said horn further comprise a dam disposed on the other side of said row of projections.

13. An apparatus for welding plastic parts, comprising first and second tools, at least one of said first and second tools being movable relative to the other, said first tool comprising a body and a plurality of surface features on one side of said body that generally project toward said second tool when said first and second tools are brought into a mutually confronting relationship, wherein said surface features comprise:

an elongated plateau having a plurality of mutually parallel, spaced grooves defining lands therebetween, said lands comprising respective elongated front surfaces that are mutually coplanar in a first plane, and said grooves being parallel to a first axis;

a plurality of projections arranged in a row with spaces therebetween, said row being generally disposed parallel to a second axis that is perpendicular to said first axis, said plateau being disposed on one side of said row of projections; and a dam disposed on the other side of said row of projections.

14. The apparatus as recited in claim 13, wherein said first tool is acoustically coupled to a source of ultrasonic wave energy.

15. The apparatus as recited in claim 13, wherein said second tool comprises first and second mutually co-planar surfaces lying in a second plane parallel to said first plane and separated by a generally straight channel extending along a line parallel to said second axis.

16. The apparatus as recited in claim 4, wherein said first plurality of surface features further comprises a flattening surface that flattens one of said first and second closure profiles in said first zone, and said second plurality of surface features comprises a planar surface that is generally parallel to said flattening surface, said array of spaced lands being closer to said planar surface than said flattening surface is.

17. The apparatus as recited in claim 9, wherein said first and second planar surfaces of said anvil lie in a second plane parallel to said first plane, and said some surface features of said horn further comprise a flattening surface lying in a third plane parallel to said first plane, said first plane being disposed between said second and third planes.

18. The apparatus as recited in claim 15, wherein said surface features of said first tool further comprise a flattening surface lying in a third plane parallel to said first plane, said first plane being disposed between said second and third planes.

19. An apparatus for welding plastic parts, comprising first and second tools, at least one of said first and second tools being movable relative to the other, said first tool comprising a body and a plurality of surface features on one side of said body that generally project toward said second tool when said first and second tools are brought into a mutually confronting relationship, wherein said surface features comprise:

an elongated plateau having a repeating pattern of projections on a surface confronting said second tool, a lengthwise direction of said elongated plateau being parallel to a first axis;

a plurality of projections arranged in a row with spaces therebetween, said row being generally disposed parallel to a second axis that is perpendicular to said first axis, said plateau being disposed on one side of said row of projections; and a dam disposed on the other side of said row of projections.

* * * * *